US007490058B2

(12) United States Patent
Dan et al.

(10) Patent No.: US 7,490,058 B2
(45) Date of Patent: Feb. 10, 2009

(54) AUTOMATED DYNAMIC NEGOTIATION OF ELECTRONIC SERVICE CONTRACTS

(75) Inventors: Asit Dan, Pleasantville, NY (US); Daniel Manuel Dias, Mohegan Lake, NY (US); Nagui Halim, Yorktown Heights, NY (US); Linh Hue Lam, Yorktown Heights, NY (US); Martin William Sachs, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 09/821,445

(22) Filed: Mar. 29, 2001

(65) Prior Publication Data
US 2002/0178103 A1 Nov. 28, 2002

(51) Int. Cl.
*G06Q 40/00* (2006.01)
(52) U.S. Cl. .......................... 705/35; 705/80
(58) Field of Classification Search .................. 705/26, 705/35, 37, 80, 500
See application file for complete search history.

(56) References Cited

U.S. PATENT DOCUMENTS

| | | | | |
|---|---|---|---|---|
| 5,794,207 | A | * | 8/1998 | Walker et al. ................... 705/1 |
| 6,148,290 | A | | 11/2000 | Dan et al. ........................ 705/1 |
| 7,024,397 | B1 | * | 4/2006 | Donahue ....................... 705/80 |
| 7,035,817 | B1 | * | 4/2006 | Brothers ........................ 705/27 |
| 7,103,580 | B1 | * | 9/2006 | Batachia et al. ............... 705/80 |
| 2002/0046157 | A1 | * | 4/2002 | Solomon ....................... 705/37 |

OTHER PUBLICATIONS

Su, S., C. Huang, and J. Hammer, "A Replicable Web-Based Negotiation Server for E-Commerce", Proceedings of the Thirty-Third Hawaii International Conference on System Sciences (HICSS-33)—vol. 8, IEEE Computer Society, Hawaii, USA, 2000.*
Robinson, W.N. and S. Volkov, "Supporting the Negotiation Life-Cycle," ACM, Communicaitons of the ACM, vol. 41 (5) pp. 95-102, 1998.*

* cited by examiner

*Primary Examiner*—Hani Kazimi
*Assistant Examiner*—Daniel Kesack

(57) ABSTRACT

A method for automating contract negotiation between a plurality of parties over a communications network. The parties communicate and agree upon a negotiation protocol before commencing the negotiation in a meta contract that is formed to govern or control the negotiation process. The automatic negotiation may include at least one sub negotiation. Machine-executable rules are specified to enable an automatic negotiation to take place between servers over a communications network. A successful negotiation may result in the formation of an electronic commerce contract. Each party may maintain the contract state of the overall negotiation, which may take place among two or more parties, wherein at least one party may be represented by a broker. Thus, complex negotiations may be handled automatically by the inventive method. The negotiation may be conducted semi-automatically to allow for human intervention in the negotiation process.

30 Claims, 9 Drawing Sheets

| 120 | General Information |
| 130 | Roles and Participants |
| 140 | Delivery Channels |
| 150 | Transport Protocol |
| 160 | DocExchange Protocol |
| 170 | Negotiation Protocol (Actions)<br>- Bind_to_service<br>- Start_subnegotiation<br>- Commit_subnegotiation<br>- Counter_offer<br>.<br>.<br>. |
| 180 | Sequencing rules |
| 190 | Policy constraints |

110

Figure 3: Meta Contract

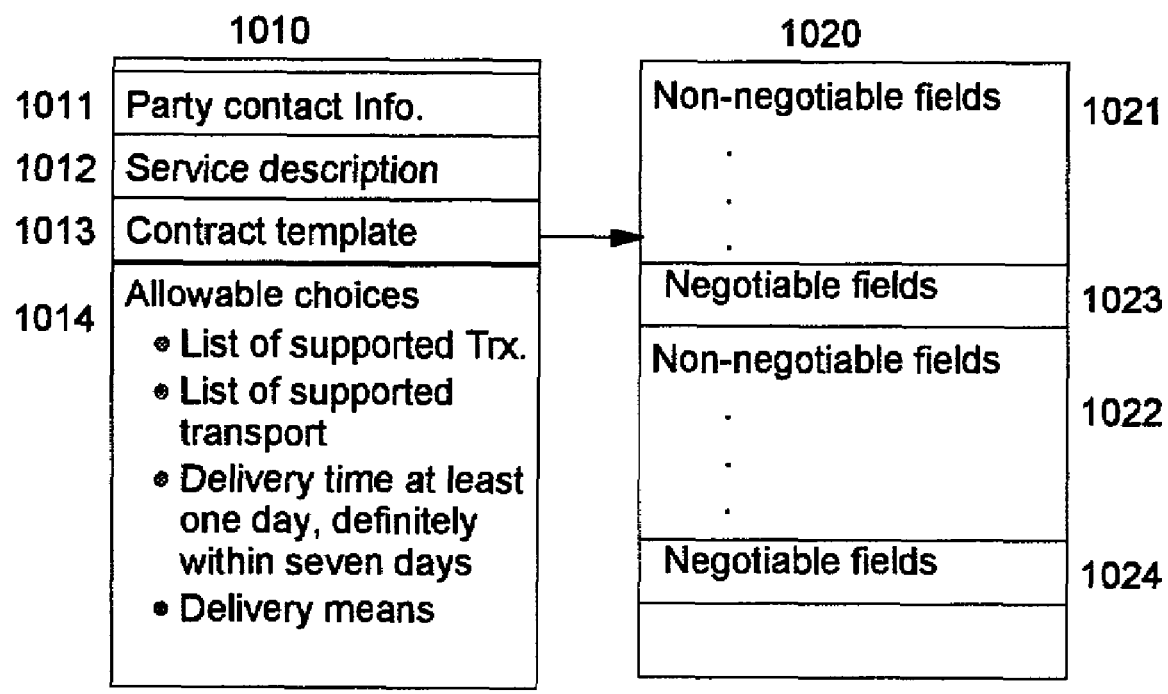
Figure 4. Party profile including Contract template

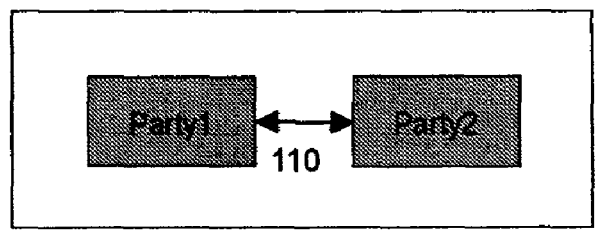
5A. Two parties direct negotiation
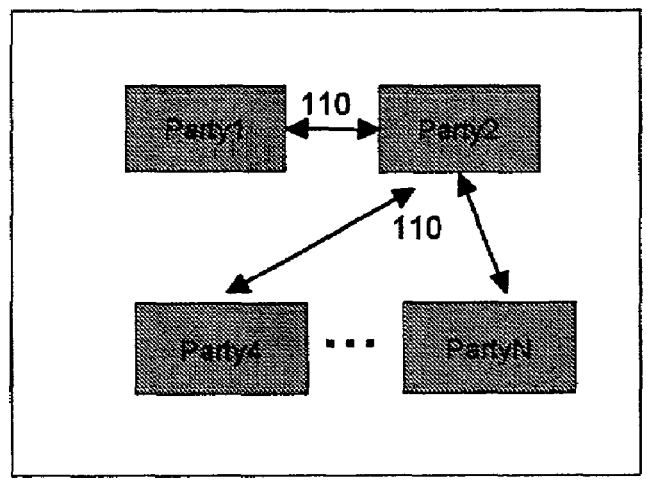
5B. Multi-parties direct negotiation
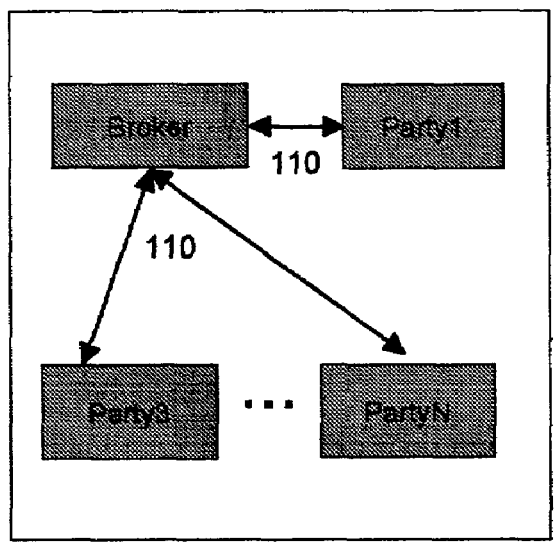
5C. Broker based negotiation
Figure 5

```
<!--***********************************************************-->
<!--          Offer DTD                                        -->
<!-- File name: Offer.dtd                                      -->
<!--***********************************************************-->
<!ELEMENT Offer (Template, TPAInstance, Sender, NegotiationItem+)>
<!--***********************************************************-->
<!-- General information                                       -->
<!--***********************************************************-->
<!ELEMENT Template (#PCDATA)>
<!ATTLIST Template TemplateId ID #REQUIRED>
<!ELEMENT TPAInstance (#PCDATA)>
<!ATTLIST TPAInstance InstanceId ID #REQUIRED>
<!ELEMENT Sender (#PCDATA) >
<!ATTLIST Sender
      PartyName CDATA #REQUIRED
      IDCodeType CDATA #REQUIRED>
<!ELEMENT NegotiationItem (Name, Type, OfferValues)>
<!ELEMENT Name (#PCDATA)>
<!ELEMENT Type (#PCDATA)>
<!ATTLIST Type DataType (String|Integer|Date|ChoiceList|Duration|Range)>
<!ELEMENT OfferValues (Value*|(StartDate, EndDate)*| (MaxNum, MinNum)*)>
<!ELEMENT Value (#PCDATA) >
<!ELEMENT StartDate (#PCDATA)>
<!ELEMENT EndDate (#PCDATA)>
<!ELEMENT MaxNum (#PCDATA)>
<!ELEMENT MinNum (#PCDATA)>
```

Figure 8

```
<!--********************************************************************-->
<!--          CounterOffer DTD                                         -->
<!-- File name: CounterOffer.dtd                                       -->
<!--********************************************************************-->
<!ELEMENT CounterOffer (Template, TPAInstance, Sender, NegotiationItem+)>
<!--********************************************************************-->
<!-- General information                                               -->
<!--********************************************************************-->
<!ELEMENT Template (#PCDATA)>
<!ATTLIST Template TemplateId ID #REQUIRED>
<!ELEMENT TPAInstance (#PCDATA)>
<!ATTLIST TPAInstance InstanceId ID #REQUIRED>
<!ELEMENT Sender (#PCDATA) >
<!ATTLIST Sender
      PartyName CDATA #REQUIRED
      IDCodeType CDATA #REQUIRED>
<!ELEMENT NegotiationItem (Name, Accept, CounterOfferValues?)>
<!ELEMENT Name (#PCDATA)>
<!ELEMENT Accept (#PCDATA)>
<!ELEMENT CounterOfferValues(Value*|(StartDate, EndDate)*| (MaxNum, MinNum)*)>
<!ELEMENT Value (#PCDATA) >
<!ELEMENT StartDate (#PCDATA)>
<!ELEMENT EndDate (#PCDATA)>
<!ELEMENT MaxNum (#PCDATA)>
<!ELEMENT MinNum (#PCDATA)>
```

Figure 9

AUTOMATED DYNAMIC NEGOTIATION OF ELECTRONIC SERVICE CONTRACTS

FIELD OF THE INVENTION

This invention relates to electronic commerce transactions and, more particularly, relates to methods for negotiating business-to-business electronic commerce contracts and agreements.

BACKGROUND OF THE INVENTION

Traditional methods of negotiating involve face-to-face negotiation, or exchanges of negotiation information through meetings, telephone calls, e-mail, faxes or other media means. In each step of the negotiation process, human involvement is indispensable. Depending on how complicated the negotiation terms and the conditions are, negotiating a business deal may be time and effort consuming. For example, during a negotiation, one party typically makes an offer and then waits for the other party to either accept or reject the offer or make a counter offer. This process may go on for each of the details that are to be agreed upon before a contract is formed. By the time all the revisions are completed, the negotiation may take hours, days or even years to close a deal. In today's quickly-evolving e-commerce world, such time-frames may be unrealistically slow and may adversely affect business transactions. Moreover, it is desirable to be able to create spontaneous business deals by reducing human involvement in the negotiation process as much as possible.

U.S. Pat. No. 6,148,290 to Dan et al., entitled "Service Contract for Managing Service Systems," which is incorporated herein by reference, has defined the concept of a electronic business-to-business ("B-B") service contract that formally specifies the rules of engagement between the parties to the contract, and enforces the contract during actual long-running interaction. The contract may be defined jointly by the parties to the agreement. The same contract may be used for multiple instances of interaction. However, the contract remains static across the interaction instances.

An example of the prior art is illustrated in FIG. 1 (PRIOR ART), which shows the usage of a service contract or a Trading Partner Agreement (TPA) between two companies. Box 10 represents Business1 that has previously agreed with Business2 20 on certain trading conditions and terms specified in a TPA 30. Whenever a business transaction 40 occurs between Business1 10 and Business2 20, there will be a check 50 against service contract 30 to make sure the transaction 40 is valid and no condition and terms in TPA 30 have been violated.

The content of a TPA 30 may include the following components: the general information, the roles and participants, the delivery channels, the transport protocol, the document exchange protocol (hereinafter "docexchange protocol") and the business protocol. The general information about the TPA provides the TPA name, its type and its version. The roles and the participants section specifies the various roles and participants along with the contact information of the business partners, and it also includes the valid duration of the contract, the number of times the contract may be used and how often it may be invoked. The delivery channels define how messages from one party's business protocol are moved to the other party's business protocol. The transport protocol defines the communication protocol, encoding and transport security information. The docexchange protocol provides information that party must agree on regarding exchange of documents between them, and it also includes message security definition. The business protocol defines the business interfaces that support the business application.

The present invention is motivated by the need to be able to negotiate automatically and dynamically between businesses. As the Internet expands, more and more companies are trying to move their business online and hoping to gain substantial business advantage because the Internet operates in a 24/7 schedule, i.e., 24 hours per day, seven days a week. Such full-time availability to potential customers is generally too costly for a traditional storefront business to keep. To do business online, it is advantageous for a company to be able to negotiate with its clients automatically and dynamically. The online shopping and the online auctioning have touched on some simpler form of automated negotiation, i.e., by collecting information from their clients via various HTML forms, whereby the output is not necessarily an electronic document/contract. Typically, for example, a business presents a template or form which a customer or client fills out and submits back to the on-line business. Negotiating a more complicated business deal, however, automatically involves exchanges of offers and counter offers between both negotiation parties or their negotiation servers until all the terms and conditions are agreed upon. Known methods of conducting negotiations do not handle complex exchanges, nor do they result in an electronic document for configuring subsequent negotiations between the parties. Furthermore, complex business deals frequently involve multiple parties as well as multiple negotiation interactions.

Therefore, there is a need for a method of negotiating dynamically and automatically via a communication network. There is also a need for a method for automated and/or dynamic negotiation of the terms of a contract. Additionally there is a need for an automated negotiation process between a plurality of parties wherein the contract negotiation process is delegated to a third party.

SUMMARY OF THE INVENTION

The present invention provides a method for automating contract negotiation between a plurality of parties, each having at least one computing system coupled to a communications network and one or more applications running thereon. In a first aspect of the invention, the method for automating contract negotiation comprises the steps of: using a negotiation meta contract to specify a negotiation protocol for negotiating parties to follow; communicating a request to negotiate; and conducting an automatic negotiation, according to the negotiation meta contract, between the one or more applications of each of the plurality of parties. The meta contract may be formed from information provided by one or more parties in one or more electronic documents prior to the negotiation. The negotiation may be comprised of at least one sub negotiation. The result of a successful negotiation may be an electronic commerce contract.

In one embodiment, one of the parties may be a service provider having a service application on a server computer system and another of the parties may be a service requester having a requester application on a client computer system. The method may further comprise the step of providing for a suspend-negotiation action to take place to enable human intervention during the negotiation. Preferably each party maintains the contract state of the overall negotiation.

In a second aspect of the invention, the method for conducting a negotiation between a plurality of parties comprises the steps of: providing a specification of machine-executable rules of negotiation for the parties for generating at least one contract; and providing a starting state for a contract, wherein the starting state may be a previous contract, a publicly defined template such as, for example, Open Buying on the Internet (OBI), or a template defined prior to the negotiation by one of the parties. The starting state of the contract to be negotiated may be selected from a set of profiles published in a repository such as, for example, a service broker public registry, by at least one of the parties prior to the negotiation. The template preferably contains business logic for performing a negotiation electronically and is preferably registered with a server prior to the negotiation. The business logic may also be registered, prior to the negotiation, with a server accessible by one or more parties and may be implemented during the automatic negotiation. The server preferably maintains negotiation logic for processing a negotiation request that is customized to the contract template.

In a third aspect of the invention, the method for conducting a negotiation between a plurality of parties, each of said parties having a server coupled to a communication network and one or more applications running thereon, comprises the steps of: providing a specification of machine-executable rules of negotiation for the parties for generating at least one contract; enabling an automatic negotiation to take place between the servers in accordance with the specification of machine-executable rules; and forming a meta contract for controlling a negotiation process.

In another embodiment, the meta contract preferably defines general information pertaining to the formation of a contract; roles and participants in the negotiation; a delivery channel; a transport protocol; a document exchange protocol; a negotiation protocol; sequencing rules; and/or policy constraints. Preferably, the negotiation protocol specifies actions to be performed in a negotiation, such as: making an offer; rejecting an offer; making a counter offer; and accepting an offer or counter offer. The negotiation protocol may further provide a suspension request to be sent to at least one of the servers for the suspension of a negotiation, to allow human intervention, and may provide for the resumption of an automatic negotiation upon termination of human intervention. Human intervention may be enabled during a suspension time interval specified by the suspension request. Preferably, the server that receives the suspension request waits until the suspension time interval expires before it takes further action.

In a further embodiment of the method for conducting a negotiation between a plurality of parties, the negotiation protocol specifies actions to be performed in a negotiation, such as starting a sub negotiation; committing a sub negotiation; accepting a sub negotiation, and/or aborting a sub negotiation. Preferably, at least one of the parties has a client application for performing at least one action of the meta contract by a human operator. The client application also preferably includes a graphical user interface.

In a preferred embodiment of the invention, the meta contract described hereinabove contains a complete set of rules for determining the validity of meta contract actions invoked during a negotiation. The meta contract may invoke at least one business specific method for determining the validity of a meta contract operation. Preferably, the meta contract invokes at least one business specific method for determining the response to a meta contract operation.

According to a further aspect of the invention, the method for conducting a negotiation between a plurality of parties, each of said parties having a computer system coupled to a communication network and one or more applications running thereon, comprises the steps of: providing a specification of machine-executable rules of negotiation for the parties for generating at least one contract; forming a meta contract that specifies a negotiation protocol; and enabling an automatic negotiation to take place between the parties in accordance with the specification of machine-executable rules; wherein at least one of the negotiating parties is an intermediary for facilitating the automatic negotiation. Furthermore, according to the method of the invention, at least one of the parties may delegate at least part of the negotiation process to a broker.

These and other objects, features and advantages of the present invention will become apparent from the following detailed description of illustrative embodiments thereof, which is to be read in connection with the accompanying drawings.

BRIEF DESCRIPTION OF THE FIGURES

FIG. 3 is a schematic diagram illustrating the elements of a negotiation meta contract;

FIG. 4 is a schematic diagram illustrating a party profile example with a contract template;

FIG. 5A is a schematic diagram illustrating two parties negotiating a service contract;

FIG. 5B is a schematic diagram illustrating a negotiation involving multiple parties;

FIG. 5C is a schematic diagram illustrating a negotiation process that has been delegated to a third party such as a broker;

FIG. 8 illustrates the preferred data type definition (DTD) covering all offer documents; and FIG. 9 illustrates the preferred data type definition (DTD) covering all counter offer documents.

DETAILED DESCRIPTION OF THE PREFERRED EMBODIMENT

The invention discloses methods for automated dynamic negotiation between at least two parties such as, for example, two businesses. As defined herein, the negotiating parties include at least a service provider and a service requester. The service provider may be, for example, a business service, company, organization or any other type of entity that advertises or publishes a business or service on a public network such as the Internet. The service requester may be any entity seeking the business or service offered by the service provider. Additionally, the negotiating parties may include a third party to which the negotiating process is delegated. Such a third party may be referred to herein as a broker.

The method of automated negotiation of the invention is capable of producing a contract such as, for example, a service contract, and preferably a business-to-business (B-B) service contract. A B-B service contract defines business information, valid actions and rules of business operations, and it may be used to govern all business transactions between the negotiating parties or businesses after all terms have been agreed upon in the contract. Such a service contract is jointly created by the negotiating parties by following an agreed upon protocol defined via a meta-service contract. The B-B contract may be negotiated directly between two businesses or it may be negotiated indirectly through a third party. The negotiation process may be fully automated between the servers or it may be semi-automated between a client using a Web browser and a server. The negotiating server may represent the business itself or a third party providing a negotiation service. Thus, the negotiation may take place, preferably automatically, between a service provider and a service requester, or a third party such as a broker may undertake the role of negotiator. Additionally, complex multi-party negotiations may be conducted automatically by the method of the invention.

Figure 1:
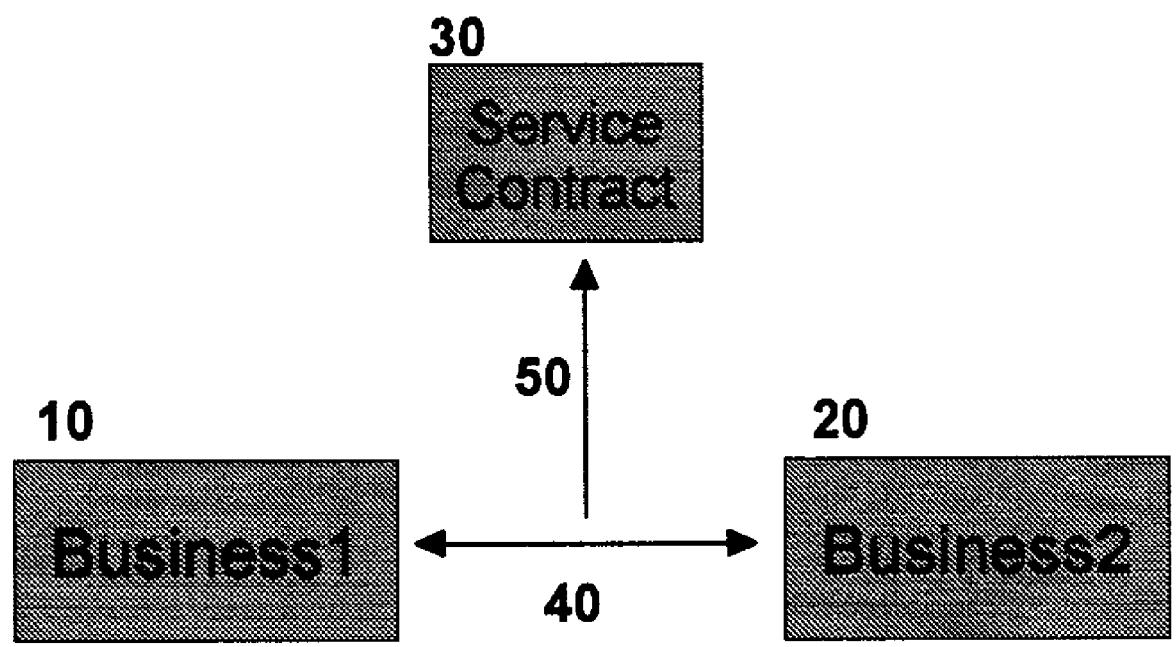
FIG. 1 (PRIOR ART) is a schematic diagram illustrating the usage of a service contract.
Figure 2:
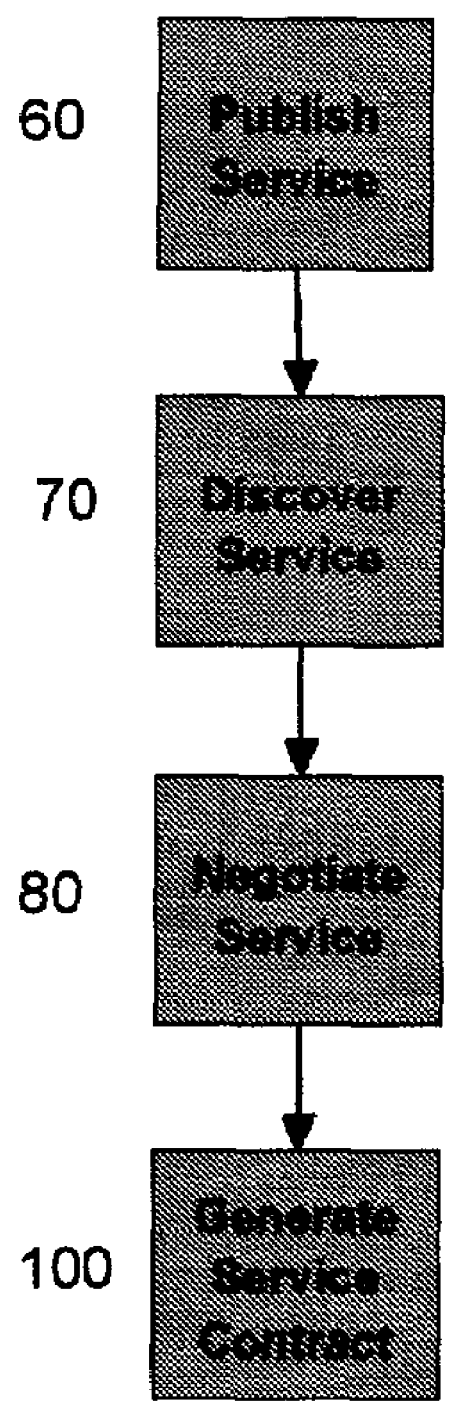
FIG. 2 is a schematic diagram illustrating the overall environment in which the negotiation system operates.

FIG. 2 illustrates the overall environment in which the invention operates. A service provider may advertise a business or service by publishing 60 on a public network such as the Internet. The service provider may be located by other entities such as, for example, a service requester, which seeks the business or service through some discovery mechanism 70 which is not covered under this invention. A negotiation 80 takes place between the service provider and the service requester wherein, optionally, a broker may represent a party and/or optionally multiple parties may participate in the negotiation. If the negotiation is successfully completed, a service contract 100 is generated.

According to the invention, a meta-contract governs or controls the negotiation process. The meta contract is either pre-negotiated or formed from information provided by the parties in one or more electronic documents, preferably in the form of profiles, described in greater detail below. The structure of the meta contract is similar to an electronic contract, such as the service contract described in U.S. Pat. No. 6,148,290. If the negotiating parties have not previously formed a meta-contract for governing negotiations between or among themselves, then they must do so before starting the automatic negotiation process. Before creating a meta-contract, the parties must first accept a negotiation protocol to be used during the negotiation process. After the parties accept the negotiation protocol, a meta-contract may be formed and the parties may begin a negotiation. If, on the other hand, the negotiating parties have previously transacted business electronically and have previously formed a meta-contract, the information stored therein may be used to build or form a meta-contract for governing a subsequent negotiation.

FIG. 3 illustrates possible elements of a negotiation meta contract 110 according to an embodiment of the present invention. These elements, discussed in further detail below, define information about the meta contract. Those of ordinary skill in the art will recognize that there are many variations and combinations of types of information that may be included in any given meta contract. In a preferred embodiment, meta contract 110 may provide, for example, general information 120, information about roles and participants 130, delivery channels 140 and transport protocol 150, document-exchange (DocExchange) protocol 160, negotiation protocol 170, sequencing rules 180 and policy constraints 190. The negotiation protocol 170 defines the negotiation operations, e.g., actions for selecting and changing values of parameters, actions for changing constraints, etc. A set of sequencing rules 180 may be provided in meta contract 110 to ensure that the various negotiation actions are being issued in the correct order. The meta contract may also provide a set of policy constraints 190 for governing the negotiation. Policy constraints may include, for example, time constraints that specify the amount of time in which a response is required or the amount of time allowed before an offer is withdrawn. It should be noted that information types 120 through 190 define information about the meta contract. The same types of information appearing in the contract that results from the negotiation may be different from the information that is in the negotiation contract or meta contract. For example, the SMTP (e-mail) protocol might be used for the negotiation process, while HTTP might be used to perform the negotiated business process. Starting definitions and values for these types of information in the negotiated contract may be provided in a TPA template or party profile.

The TPA template or party profile may be included as part of the information advertised by the service provider in step 60 of FIG. 2. The profile serves as the starting point of a negotiation by providing an initial version of a contract document. The profile may include information such as: products and services provided, specific business processes that the service provider can perform, security requirements, and technology information such as which message-exchange protocols are supported by the service provider. The service provider's profile may be embodied in a variety of different forms. Several examples of the service provider's profile are described herein, although alternative profile forms will be apparent to those of ordinary skill in the art.

In one embodiment, the service provider's profile may describe the capabilities of one party. This profile may be expressed, for example, as an XML document whose contents may be incorporated into a contract. The information contained in the profile may include not only the capabilities of a party but also may contain requirements of the interacting party in the form of a contract template. The contract template is provided to express a contract either between a pair of roles or between an actual party (whose profile is represented by the template) and a role. One example of a contract template is an almost-complete electronic contract document with a few fields left blank: these fields are to be filled in by the negotiating party. An enhanced template additionally specifies, in an associated document, the acceptable choices for the negotiable fields.

FIG. 4 is a schematic diagram that illustrates a party profile and a contract template. Party profile 1010 may contain, for example, party contact information 1011, a description of the service offered or needed 1012, one or more contract templates 1013, and allowable choices 1014. Allowable choices 1014 may cover, for example, business and/or technical considerations such as a list of supported transport protocols, a list of supported shipping or transport services (such as overnight shipping, airmail delivery, etc.), delivery times, and/or the optional use of a preexisting meta contract. Profile 1010 may include a contract template 1020 containing one or more nonnegotiable fields 1021, 1022 and one or more negotiable fields 1023, 1024. As mentioned above, a negotiable field 1023 or 1024 may be treated as a blank that may be completed by the negotiating party or, alternatively, may specify capabilities or allowable choices that may be selected. The capabilities and/or allowable choices may be provided as searchable information by a public registry or repository.

In another embodiment, the service provider's profile may be a previously created contract or Trading Partner Agreement (TPA) between the party whose profile it represents and another role to be filled by the negotiating party. This previously created TPA may be used for creating a new TPA between the two parties. The previously created TPA is thus actually a joint profile of the two parties and the negotiation process consists of modifying this TPA, rather than choosing elements from separate profiles. The profile may also include the negotiation protocol to be used by the negotiating parties. The information is then captured in a meta contract that controls the negotiation process.

In yet a further embodiment, an initial version or starting state of a contract may be a publicly defined template. One example of a known template or publicly available specification is Open Buying on the Internet, or OBI. In a preferred embodiment of the invention, an initial version of a contract may be obtained from a repository that contains a collection of searchable information, including individual businesses' contract templates or profiles and other related information. The searchable information may be published, thus enabling businesses to be found by other businesses that are looking for partners. Some examples of existing repositories include UDDI, OASIS and ebXML. The repository may also be a service broker public registry. Processes for discovering these repositories and the information published thereon are known to those of ordinary skill in the art. Thus, for example, according to one embodiment of the invention, the initial version of the contract is selectable from a set of profiles published in a repository by at least one of the parties prior to the negotiation.

According to another embodiment, when each of the parties has a preexisting profile, an initial version of a contract may be created by automatically combining information from the profiles, subject to a later negotiation process. The information that is combined comprises the common characteristics of each of the parties. For example, the initial version of the contract may be for a business process that both parties support. It may contain the communications details for a communication protocol that both parties are capable of performing, security characteristics that both share, etc. Once the initial version of the contract is created, the negotiation process may begin, wherein the negotiation method includes the step of selecting values of variable parameters to which all parties agree. If, for example, all the parties share in common more than one communication protocol, the negotiation process may choose one protocol. Another example of parameters to which the parties may initially agree is the selection of communication and business process timeouts. The negotiation process is facilitated by including priority indicators with the different elements of the profile so that an initial offer may choose elements that are high priority in all the profiles in question. For example, if all the parties support both SMTP and HTTP for communications, and all have HTTP as high priority, HTTP may automatically be used.

If the service requester's initial requirements are met and it is interested in making a deal with the service provider, the service requester may negotiate 80 automatically with the service provider for its terms and conditions, as described in greater detail below. The result of the negotiation process is a contract 100 for performing the business process that the parties wish to perform. Preferably, the contract 100 is a service contract 100 that will be used to guide and validate all business operations when the parties or entities enter into a business execution phase.

FIGS. 5A, 5B and 5C illustrate different methods of automated contract negotiation between businesses. FIG. 5A illustrates two parties negotiating a service contract directly. FIG. 5B illustrates a negotiation for a service contract that may involve multiple parties. FIG. 5C illustrates a negotiation process that has been delegated to a third party such as, for example, a trading service broker. Whether a business party negotiates with another party directly or through a broker, it is preferable to employ a negotiation meta contract 110 that defines a negotiation protocol for the interested negotiating parties to follow.

The actions of meta contract 110 may be performed either by programmatic means or by human operators/negotiators via graphical user interface (GUI) tools. The meta contract 110 may provide a complete set of machine-executable rules of negotiation which determine whether certain invocations of meta contract actions are valid. For example, the meta contract 110 may contain rules that determine whether a price offered is within an acceptable range given the service volume that has been negotiated and/or specified. Furthermore, the meta contract may allow for human intervention is a business rule calls for it. Alternately, meta contract actions may invoke business specific methods that determine the validity of or response to a meta contract operation. The methods in the meta contract relate to the negotiation process and so may be the same or different from those in the negotiated contract. Here, "method" refers to software invoked by the actions in the meta contract 110 that relate to negotiation. An example might be a method that evaluates an offered price to see if it is within an acceptable range. In addition, the meta contract may provide or express rules for controlling the flow of the negotiation process.

The following table provides an exemplary list of valid actions of a negotiation meta contract 110 along with their required parameters, their responses, who may invoke these actions and their descriptions. This table describes direct negotiation between two parties. The provider is the party that will provide services to the requester under the negotiated contract. It will be understood that evaluation of an offer or counter offer may involve a human being at either party. Human involvement may occur when the suspend-negotiation action is performed.

| Action name | Parameters | Response | Invoker | Description |
| --- | --- | --- | --- | --- |
| Bind_to_service | TPA_id, Version, Action_request, Component_id | Accept Reject Abort | Requester | Requester starts negotiation with the provider. Component_id is needed only when Action_request is to update or to continue. |
| Start_sub negotiation | Component_id, Offer_id, Offer_doc | Accept Reject(component_id, offer_id, counter_offer_doc) | Provider | Provider sends the requester an Offer_doc containing values to be negotiated for a specific component |
| Counter_Offer | Component_id, Offer_id, Counter_offer_doc | Accept Reject(component_id, offer_id, counter_offer_doc) | Provider | Provider counter-offers a rejected offer. |
| Accept | Component_id, Offer_id | OK | Requester Provider | Either the provider or the requester may accept an offer or counter offer. |

-continued

| Action name | Parameters | Response | Invoker | Description |
|---|---|---|---|---|
| Reject | Component_id, Offer_id, Counter_offer_doc | Accept Reject(component_id, offer_id, counter_offer_doc) | Requester Provider | Either the provider or the requester may reject an offer or a counter offer, and send back its counter offer. |
| Commit_sub negotiation | Component_id | Accept_sub negotiation Abort_sub negotiation | Provider | The provider tells the requester that it is ready to commit the negotiated component. |
| Accept_sub negotiation | Component_id | OK | Requester | The requester accepts the negotiated component. |
| Abort_sub negotiation | Component_id | OK | Requester Provider | Either the provider or the requester may abort the negotiation of a certain component. |
| Abort_negotiation | TPA_id | OK | Requester Provider | Either the provider or the requester may abort the whole negotiation. |
| Suspend_negotiation | TPA_id Suspension_time | OK | Requester Provider | Either the provider or the requester may suspend the negotiation for necessary human intervention. Whoever issues the suspension will need to issue start_sub negotiation to resume the negotiation. |
| Commit_negotiation | TPA_id, Signed_joint_TPA | Sign(Signed_joint_TPA) Reject_negotiation (TPA_id) | Provider | Provider first signs the complete joint TPA, and then sends it to the requester to sign. Both signings are done electronically. |
| Negotiation_complete | TPA_id | OK | Provider | Provider acknowledges receiving the signed joint TPA from the requester. |

Figure 6:
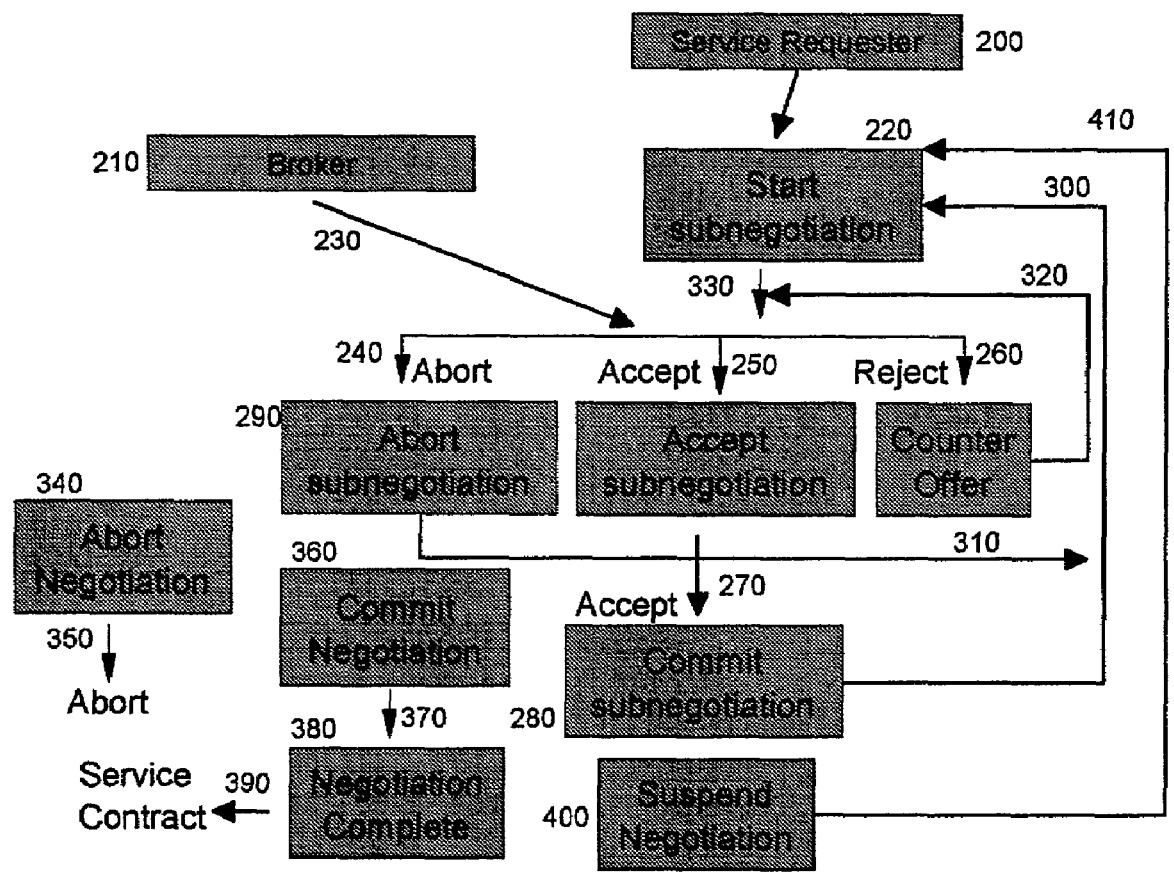
FIG. 6 is a flow diagram of the automated negotiation interactions between the negotiating parties.

FIG. 6 shows the automated negotiation interactions between a service requester 200 and a broker 210 representing a service provider. Similar sets of actions may be performed by each of the parties as in case of direct negotiation. For multiparty negotiation, each party maintains the contract state of the overall negotiation. After the successful bind_to_service request, the service requester issues request 220 to instantiate the negotiation process.

A negotiation comprises one or more sub negotiations. Each sub negotiation involves a subset of all of the items to be negotiated. Typically, the subset comprises a set of related items. For example, the subset may include the set of security parameters or the set of all prices involved in the contract being negotiated.

Upon receiving sub-negotiation request 220, if the broker/provider 210 accepts the request to negotiate from requester 200, it starts to negotiate 230 the items that make up one sub component of the entire final service contract. Arrows 240, 250 and 260 illustrate the different outcomes for request 220. Outcome 240 is used for aborting the sub negotiation, outcome 250 is used for accepting, and outcome 260 is for rejecting a sub negotiation. When a sub negotiation is accepted 270 by both parties, the next step is to commit the negotiation on this sub component as illustrated in box 280. The step following Commit Subnegotiation step 280 and also following Abort Subnegotiation step 290 is to continue the negotiation 300 for the next sub component. If the response for sub-negotiation request 220 is to reject 260 the sub negotiation, then an offer is countered from Counter Offer step 310 and the negotiation iterates from path 320 back to point 330 for further negotiation.

If either one of the parties chooses to abort 340 the negotiation at any time during the negotiation, the outcome 350 is the termination of the entire negotiation process. When all the sub components of a contract have been agreed by both sides, the negotiation is committed in step 360, and the negotiation continues 370 to step 380 where the negotiation is complete and step 390 leads to the service contract or TPA.

If human intervention is required by either the requester or the provider during the negotiation, a suspend negotiation action 400 may be invoked with the intended suspension time, and the subsequent action 410 for the invoker of the suspension has to be sub-negotiation request step 220 to resume the negotiation. The server that receives the suspension request waits until the suspension time expires before it takes further action, i.e., to involve human intervention at this time or to abort the negotiation all together.

Figure 7:
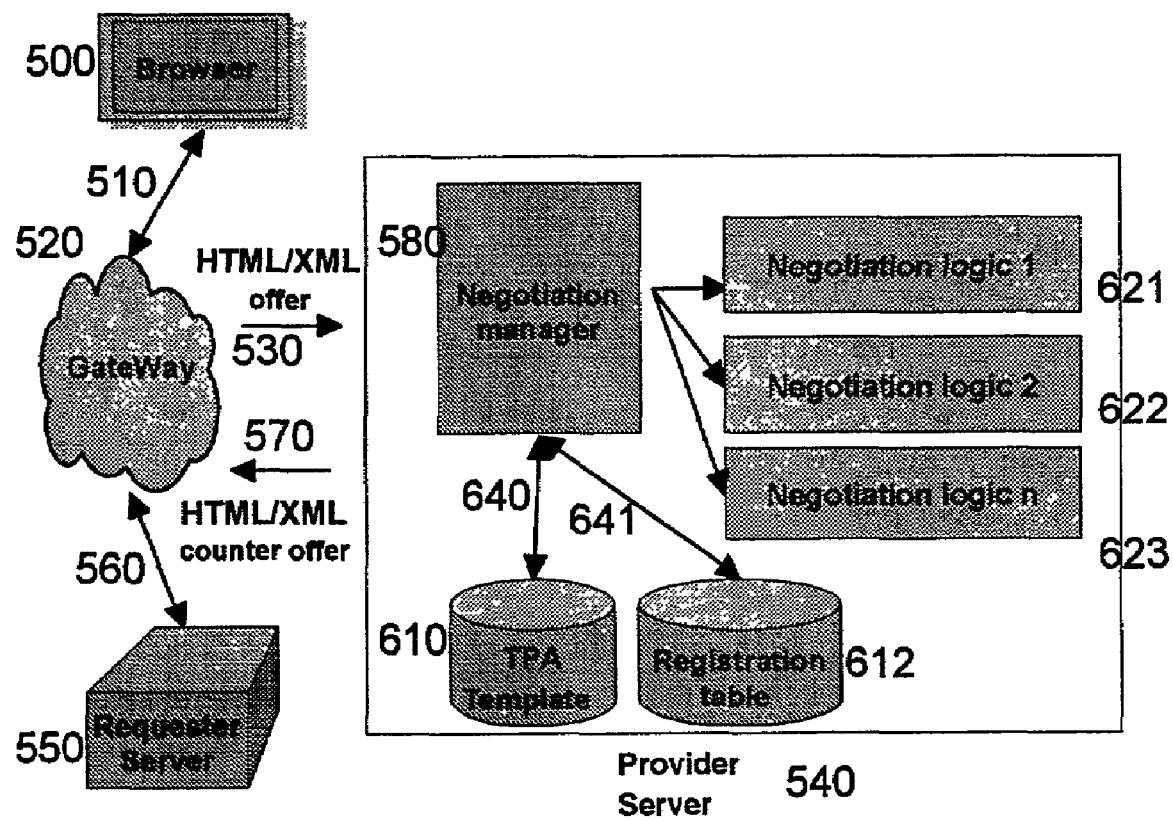
FIG. 7 is a schematic diagram illustrating the general architecture of a negotiation system.

FIG. 7 illustrates an example of a general architecture for a negotiation system which may be either be semi-automated or fully automated. In a semi-automated case, a requester's browser 500 sends an HTML page through connection 510 to the Internet gateway 520, and gateway 520 forwards the request through link 530 to the provider server 540. In an automated case, a requester server 550 sends an XML document through connection 560 to the Internet gateway 520, and gateway 520 also forwards the request in a similar way to the provider server 540. The provider server 540 sends its response back to the requester through connection 570, preferably either as an HTML page or an XML document. The exchanged documents may be either the offer or the counter offer documents containing the items under negotiation. The offer/counter offer documents are discussed in greater detail below.

Provider server 540 may include the following components: negotiation manager 580, TPA template and profile data base 610, a registration table 612 for maintaining references to the customized logic to be called during online negotiation and registered negotiation logic routines 621, 622 and 623 specific to the negotiation of a particular contract template. The negotiation manager 580 processes all negotiation requests and invokes appropriate negotiation logic by looking up the registration table before returning a response to the requester. The look up process takes into account not only the context of the negotiation, i.e., the contract template being used, but also the specific field being negotiated via this request. For a given negotiation request, negotiation manager 580 accesses the appropriate meta contract, template or TPA in data base 610 through link 640. Negotiation logic 621, 622 or 623 is then invoked by the negotiation manager to determine a response that is customized to the negotiation request. During the set up phase of a service negotiation, i.e., prior to publishing a service, new logic components are registered to the registration table 612 along with the TPA template entry to be used for this service. The TPA template and profile data base 610 maintains information regarding meta contracts, various negotiation templates and current TPAs.

FIG. 8 illustrates the preferred data type definition (DTD) covering all offer documents. Although the DTD shown in FIG. 8 is written in XML, it will be readily apparent to those of ordinary skill in the art that the language of the offer document is not limited to XML, nor is it limited to the specific sequence of instructions provided. As illustrated in FIG. 8, the offer may, for example, contain the following information: the template that the servers use to negotiate, the TPA instance under negotiation, the sender of the offer, the items to be negotiated, and an allowable set of values for these items. After an initial contact between a service requester and a service provider or broker, a TPA negotiation may involve getting agreements on a series of offers and counter offers.

The <Template> tag may specify the URL of the server where the template resides. The <Template> tag has one attribute which is required. The value of the TemplateId attribute is a string which provides a unique identifier for the template being negotiated.

The <TPAInstance> tag defines the current TPA instance that the servers are negotiating. It has one required attribute, InstanceId, which is a string to provide a unique identifier for the joint TPA under negotiation.

The <Sender> tag defines who is the sender of this offer document. It has two required attributes: PartyName and IDCodeType. The PartyName attribute is a string which uniquely identifies the sender, and the IDCodeType attribute specifies the kind of identifier given by the PartyName, whether it is a DUNS number or some other recognized business identifier.

The <NegotiationItem> tag defines the list of items to be negotiated. The <NegotiationItem> defines three other tags: <Name>, <Type> and <OfferValues>. There may be more than one negotiation item in the offer document.

The <Name> tag defines the negotiation variable name using XPATH Location Path notation.

The <Type> tag has a DataType attribute to specify the data type of a negotiation variable and the data types may be one of the following types: String, Integer, Date, ChoiceList, Duration, Range. The ChoiceList provides a way to specify a selection of possible negotiation values. The Duration is used to specify a period of time spanned by days, and the Range is used to describe a numeric bound.

The <OfferValues> tag may specify zero or more of the <Value> tags, <StartDate> and <EndDate> tags or <MaxNum> and <MinNum> tags. The <Value> tag defines the offer/counter offer value of a negotiation variable. The <StartDate> and the <EndDate> tags specify a date range, and the <MaxNum> and the <MinNum> tags specify a numeric range.

FIG. 9 illustrates the preferred data type definition (DTD) covering all counter offer documents. After evaluating an offer from a service provider, the requester server may send back its response in a counter offer document to indicate what in the offer has been accepted or rejected. A counter offer document may contain a Template id, a TPA id, a Sender id and a list of negotiating items along with their accepted or rejected value(s). The <Template> tag, the <TPAInstance> tag and the <Sender> tag have the same definitions as those defined in the offer document content section.

The <NegotiationItem> tag in the counter offer document may have three tags: the <Name> tag, the <Accept> tag and the <CounterOfferValues> tag. The <Name> tag defines the negotiation variable name using XPATH Location Path notation. The <Accept> tag indicates whether the offered value has been accepted. The <CounterOfferValues> tag may specify zero or more of a <Value> tag, a <StartDate> and <EndDate> tag pair, or a <MaxNum> and <MinNum> tag pair. The <Value> tag specifies a counter offer value for the negotiation variable. The <StartDate> and the <EndDate> tags together define a range for the dates. The <MaxNum> and the <MinNum> tags define a numeric range.

In our preferred embodiment, the negotiation logic may be registered with a server along with publishing of the service. That is, the negotiation logic is made known to the server so that the server may call that logic.

It is important to note that while the present invention has been described in the context of a fully functioning computer system, those of ordinary skill in the art will appreciate that the methods of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital analog communications links, wired or wireless communications links using transmission forms, such as, for example, radio frequency and light wave transmissions. The computer readable media may take the form of coded formats that are decoded for actual use in a particular data processing system containing one or more programs.

Furthermore, it will be apparent to those of ordinary skill in the art that the method of conducting a negotiation between a plurality of parties may be executed by an article of manufacture comprising a machine readable medium containing one or more programs. In addition, it will be apparent that the invention describes a method of conducting business over the Internet and that the automatic negotiation may be conducted by data communication network components on behalf of parties such as, for example, service providers, service requesters, brokers and/or intermediaries.

The description of the present invention has been presented for purposes of illustration and description and is not intended to be exhaustive or limited to the invention in the form disclosed. Many modifications and variations will be apparent to those of ordinary skill in the art. The illustrations of the preferred embodiment were chosen and described in order to best explain the principles of the invention, the practical application, and to enable others of ordinary skill in the art to understand the invention for various embodiments with various modifications as are suited to the particular use contemplated.

What is claimed is:

1. A method for automating contract negotiation between a first party having a first computing system and a second party having a second computing system, each of the first computing system and the second computing system being coupled to a communications network and having one or more applications running thereon, the method comprising the steps of:

establishing a common negotiation protocol that specifies negotiation operations, the negotiation protocol being agreed upon by the first party and the second party prior to the contract negotiation;

conducting a pre-negotiation between the first party and the second party to form a negotiation meta contract to control the contract negotiation, in accordance with the negotiation protocol, wherein the meta contract is formed at least in part from information provided by at least one of the first party and the second party in at least one electronic document, prior to the negotiation;

communicating a request to negotiate; and conducting a fully automated negotiation, according to the negotiation meta contract, between the one or more applications running on each of the first computing system and the second computing system, wherein each of the first computing system and the second computing system maintains a contract state of the negotiation.

2. The method of claim 1, further comprising the step of performing at least one sub negotiation.

3. The method of claim 1, further comprising the step of forming an electronic commerce contract.

4. The method of claim 1, wherein the first party is a service provider having a service application on the first computing system, which is a server computer system, and the second party is a service requester having a requester application on the second computing system, which is a client computer system.

5. The method of claim 1, further comprising the step of providing for a suspend-negotiation action to take place to enable human intervention during the negotiation.

6. A method for conducting a negotiation between a first party having a first computer system and a second party having a second computer system, each of said first computer system and the second computer system being coupled to a communication network and having one or more applications running thereon, the method comprising the steps of:

providing a specification of machine-executable rules of negotiation for the first computing system and the second computing system for generating at least one contract, the specification being agreed upon by the first party and the second party prior to conducting the negotiation;

conducting a pre-negotiatlon between the first party and the second party to form a starting state for a contract in accordance with the specification, wherein the starting state is formed at least in part from information provided by at least one of the first party and the second party in at least one electronic document, prior to the negotiation, the at least one electronic document being selectable from one of: a previous contract, a publicly defined template, and a template defined prior to the negotiation by one of the first party and the second party; and conducting a fully automated negotiation, according to the starting state, between the one or more applications running on each of the first comouting system and the second computing system, wherein each of the first computing system and the second computing system maintains a contract state of the negotiation.

7. The method of claim 6, wherein the starting state is selectable from a set of profiles published in a repository by at least one of the plurality of parties prior to the negotiation.

8. The method of claim 6, wherein the publicly defined template is an electronic commerce business-to-business purchasing standard.

9. The method of claim 7, wherein the repository is a service broker public registry.

10. A method for conducting an automatic negotiation between a first party having a first computer system and a second party having a second computer system, each of said first computer system and the second computer system being coupled to a communication network and having one or more applications running thereon, the method comprising the steps of:

establishing a common negotiation protocol that specifies negotiation operations, the negotiation protocol being agreed upon by the first party and the second party prior to the negotiation;

conducting a pre-negotiation between the first party and the second party to form a template prior to the negotiation in accordance with the negotiation protocol, wherein the template is formed at least in part from information provided by at least one of the first party and the second party in at least one electronic document, prior to the negotiation, wherein the template contains business logic for performing a negotiation electronically;

registering the business logic, prior to the negotiation, with a server accessible by one or more of the first party and the second party; and implementing the business logic in a fully automated negotiation conducted between the first computer system and the second computer system over the communication network, wherein each of the first computer system and the second computer system maintains a contract state of the negotiation.

11. The method of claim 10, wherein the template is registered with the server prior to conducting the fully automated negotiation between the first computer system and the second computer system over the computer network.

12. The method of claim 10, wherein the server maintains negotiation logic for processing a negotiation request that is customized to the contract template.

13. A method for conducting a negotiation between a first party having a first server and a second party having a second server, each of said first server and the second server being coupled to a communication network and having one or more applications running thereon, comprising the steps of:

providing a specification of machine-executable rules of negotiation for the first server and the second server for generating at least one contract, the specification being agreed upon by the first party and the second party prior to conducting the negotiation;

enabling a fully automated negotiation to take place between the first server and the second server in accordance with the specification of machine-executable rules; and conducting a pre-negotiation between the first party and the second party to form a meta contract for controlling the fully automated negotiation in accordance with the specification, wherein the meta contract is formed at least in part from information provided by at least one of the first party and the second party in at least one electronic document, prior to the negotiation, wherein each of the first server and the second server maintains a contract state of the negotiation.

14. The method of claim 13, wherein the meta contract defines at least one of: general information pertaining to the formation of a contract; roles and participants in the negotiation; a delivery channel; a transport protocol; a document exchange protocol; a negotiation protocol; sequencing rules; and policy constraints.

15. The method of claim 14, wherein the negotiation protocol specifies actions to be performed in a negotiation, including at least one of: making an offer; rejecting an offer; making a counter offer; and accepting an offer or counter offer.

16. The method of claim 15, wherein the negotiation protocol provides a suspension request to be sent to at least one of the first server and the second server for a suspension of a negotiation to allow human intervention 17. The method of claim 15, wherein the negotiation protocol provides for a resumption of an automatic negotiation upon termination of human intervention.

18. The method of claim 16, wherein the suspension request specifies a suspension time interval in which human intervention is enabled.

19. The method of claim 18, wherein the at least one of the first server and the second server that receives the suspension request waits until the suspension time interval expires before it takes further action.

20. The method of claim 14, wherein the negotiation protocol specifies actions to be performed in a negotiation, including at least one of: starting a sub negotiation; committing a sub negotiation; accepting a sub negotiation, and aborting a sub negotiation.

21. The method of claim 13, wherein at least one of the first server and the second server further has a client application for performing at least one action of the meta contract by a human operator.

22. The method of claim 21, wherein the client application has a graphical user interface.

23. The method of claim 13, wherein the meta contract contains a complete set of rules for determining the validity of meta contract actions invoked during a negotiation.

24. The method of claim 13, wherein the meta contract invokes at least one business specific method for determining the validity of a meta contract operation.

25. The method of claim 13, wherein the meta contract invokes at least one business specific method for determining the response to a meta contract operation.

26. A method for conducting a negotiation between a first party having a first computer system and a second party having a second computer system, each of said first computer system and the second computer system being coupled to a communication network and having one or more applications running thereon, comprising the steps of:

providing a specification of machine-executable rules of negotiation for the first computer system and the second computer system for generating at least one contract, the specification being agreed upon by the first party and the second party prior to conducting the negotiation;

conducting a pre-negotiation between the first party and the second party to form a meta contract to control the negotiation, in accordance with the specification, wherein the meta contract is formed at least in part from information provided by at least one of the first party and the second party in at least one electronic document, prior to the negotiation; and enabling a fully automated negotiation to take place between the first computer system and the second computer system in accordance with the specification of machine-executable rules;

wherein a third party having a third computer system is an intermediary for facilitating the a fully automated negotiation, wherein each of the first party, the second party, and the third party maintains a contract state of the negotiation.

27. The method of claim 26, wherein at least one of the first party and the second party delegates at least part of the negotiation to a broker.

28. A method of conducting a negotiation over a data communication network between a service provider having a server computing system and a service requester having a client computing system, comprising the steps of:

establishing, by the service provider and the service requester, a common negotiation protocol that specifies negotiation operations, the negotiation protocol being agreed upon by the service provider and the service requester prior to the contract negotiation;

conducting a pre-negotiation between the service provider and the service requester to form a negotiation meta-contract to control the negotiation, in accordance with the negotiation protocol, wherein the meta contract is formed at least in pail from information provided by at least one of the service provider and the service requester in at least one electronic document, prior to the negotiation;

receiving, at the server computing system, a request to negotiate from the client computing system; responsive to the request to negotiate, conducting a fully automated negotiation with the client computing system by the server computing system in accordance with the negotiation meta-contract, wherein each of the server computing system and the client computing system maintains a contract state of the negotiation.

29. The method of claim 28, wherein the step of conducting a fully automated neotiation with the client computing system by the server computing system comprises one of: sending an offer, sending an acceptance, sending a counter offer, sending a rejection, aborting the negotiation, suspending the negotiation, and committing the negotiation.

30. A method of conducting business over the Internet, wherein a first party and a second party negotiate contractual terms between a first data communication network component and a second data communication network component, the method comprising the steps of:

providing a specification of machine-executable rules of negotiation for generating at least one contract, the specification being agreed upon by the first party and the second party prior to negotiating the contractual terms;

conducting a pre-negotiation between the first party and the second party to form a meta contract to control negotiating, in accordance with the specification, wherein the meta contract is formed at least in part from information provided by at least one of the first party and the second party in at least one electronic document, prior to negotiation; and originating a fully automated negotiation at the first data communication network component in accordance with the rules of negotiation, wherein each of the first data communication network component and a second data communication network component maintains a contract state of the negotiation.

* * * * *